J. H. DONALDSON.
AUTOMATIC RELEASE HANDLE FOR VESTIBULE CURTAINS.
APPLICATION FILED JAN. 21, 1914.
1,094,135.
Patented Apr. 21, 1914.
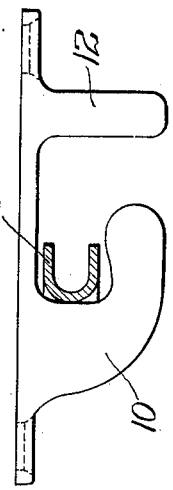
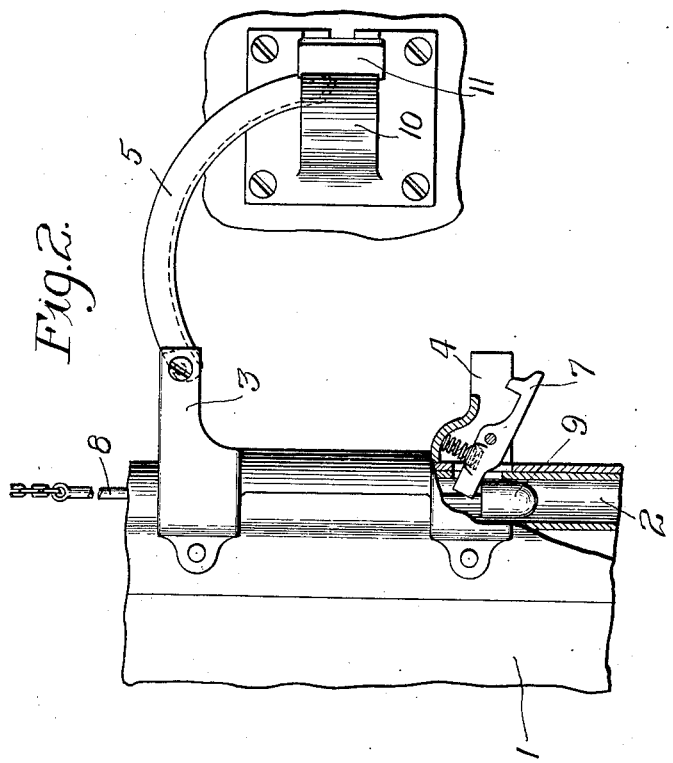
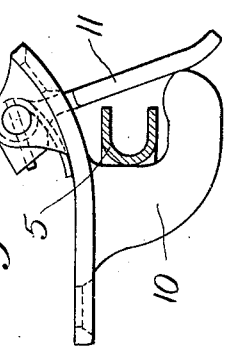
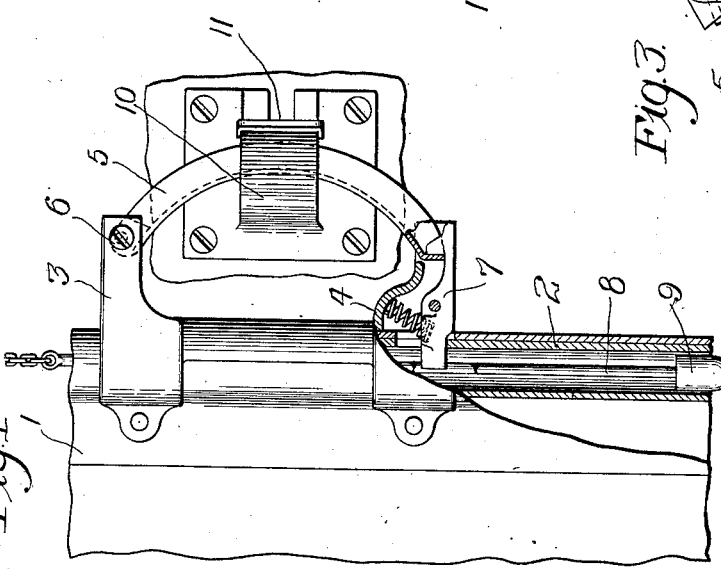
Witnesses
H. R. Keitley
Ruth E. Zetterwall
Inventor
James H. Donaldson
by Chamberlin & Freudenreich
Attys.

UNITED STATES PATENT OFFICE.

JAMES H. DONALDSON, OF CHICAGO, ILLINOIS.

AUTOMATIC-RELEASE HANDLE FOR VESTIBULE-CURTAINS.

1,094,135.   Specification of Letters Patent.   Patented Apr. 21, 1914.

Application filed January 21, 1914. Serial No. 813,353.

*To all whom it may concern:*

Be it known that I, JAMES H. DONALDSON, a citizen of the United States, residing in Chicago, county of Cook, State of Illinois, have invented a certain new and useful Improvement in Automatic - Release Handles for Vestibule-Curtains, and declare the following to be a full, clear, and exact description of the same, such as will enable others skilled in the art to which it pertains to make and use the same, reference being had to the accompanying drawings, which form a part of this specification.

It is common practice to provide vestibule curtains with handles which will automatically release in case two cars draw apart from each other for any reason. The customary arrangement is to have the curtain mounted on one car and to have a hook of some kind on the other car for engaging with a curtain handle hinged at one end and detachably held at the other end by a catch. These hooks take various forms, some being provided with guards to prevent the handle from becoming detached accidentally. A difficulty which is experienced with handles of the type hinged at one end, when they are made to coöperate with a hook having a guard is that, upon release of the free end of the handle, the handle instead of being drawn upwardly out of the hook as the cars separate, binds between the hook and the guard so that something must inevitably break; the result being that either the handle is broken or twisted or the curtain is torn.

My invention has for its object to produce a simple and novel handle which will automatically free itself from any kind of a hook whether the latter be provided with a guard or not.

The various features of novelty whereby my invention is characterized will hereinafter be pointed out with particularity in the claims; but for a full understanding of my invention and of its object and advantages, reference may be had to the following detailed description taken in connection with the accompanying drawing, wherein:

Figure 1 is a view partly in side elevation and partly in section of one edge of a curtain, a handle arranged in accordance with a preferred form of my invention, and a hook for receiving the handle, the hook being provided with a guard; Fig. 2 is a view similar to Fig. 1 showing the condition of the parts after the cars have separated and the handle has almost completely released itself; Fig. 3 is a top plan view of the guard shown in Figs. 1 and 2, with the handle in section; and Fig. 4 is a view similar to Fig. 3, illustrating another form of hook and guard.

Referring to the drawing, 1 represents a curtain, the stick, 2, of which is made in the form of a tube. A bracket containing two separated arms, 3 and 4, is fixed to the stick of the curtain.

5 is a bar or handle hinged at its upper end, as at 6, to the arm 3 and so proportioned that its free end is free to swing into proximity to the free end of the arm 4. The arm 4 contains a suitable catch, 7, for engaging with the free end of the handle or bar and locking it to the arm 4. The catch is tripped in any suitable way when the car on which the curtain is mounted begins to separate from the car to which the handle or bar 5 is detachably secured. In the arrangement shown, the catch is tripped by means of a rod, 8, within the tubular curtain stick and provided with a shoulder, 9, which is caused to rise when the curtain is extended beyond a predetermined degree, striking the catch and releasing the free end of the handle.

10 represents a hook fixed to the door post of a car and adapted to receive the bar or handle, 5, and hold the curtain extended. In the arrangement shown in Figs. 1, 2 and 3 the hook 10 is provided with a spring pressed guard, 11, which completely closes the opening through which the handle must pass in order to enter the hook.

All the parts heretofore described are of old and well known construction with the exception of the handle, the present invention residing in the shape of the handle and not being limited to the structural details of the other parts.

Where the handle is made in the form of a straight bar, it will be seen that as the hook travels away from the curtain stick after the catch has been tripped, the handle will gradually assume an angle to the perpendicular position which it ordinarily occupies and will bind between the hook and the guard. The greater the angle to the vertical, the greater the tendency to bind and therefore if even the extreme end portion at the free end of the handle is straight, this portion will lock itself between the hook and the guard and will prevent the handle from becoming detached; the result being that either the handle or the guard will become broken or twisted, or else the curtain will be torn. I have discovered that by giving the handle a gradual curve throughout its length, that portion of the handle lying between the hook and the guard in any of the angular positions which the handle assumes as the cars are drawn apart, will be free and will not bind between the hook and the guard. Of course it is not necessary to continue the curvature from the free end clear to the hinged end because the upper third of the handle does not have to be drawn upwardly through the hook; but it is preferable to continue the curvature throughout the length of the handle so as to preserve a neat appearance and permit free up and down play in ordinary service. Where the hook and its guard leave a space only a little wider than the handle, as illustrated in the first three figures, the handle is preferably made in the form of an arc of a circle. This circle must not be made too large in diameter and it must not be too small or the best results will not be obtained. In the arrangement shown, the curvature of the handle is approximately that of a circle drawn about an equilateral triangle each of whose sides is equal in length to the shortest distance between the hinge and the free end of the arm. Where the hook is provided with a stationary guard separated far enough to leave an opening large enough for the admission of the handle, the curvature of the handle need not be so great. In other words, the curvature may be made flatter than illustrated in Figs. 1 and 2. Such a hook as this is illustrated in Fig. 4, the guard, 12, being separated far enough from the hook to permit the handle to be inserted and taken out freely. However, if the handle is made approximately as shown, it will be adapted for use in connection with any hook or holding device which provides only enough space for a limited free up and down movement of the handle in ordinary service, as well as with the hook shown in Fig. 4.

While I have illustrated and described with particularity only a single preferred form of my invention, I do not desire to be limited to the exact structural details thus illustrated and described, but intend to cover all forms and arrangements which come within the terms employed in the definitions of my invention constituting the appended claims.

I claim:

1. In an automatic release handle, a curved bar hinged at one end, and a catch for detachably holding the free end of the bar, the curvature of the handle extending entirely to the free end.

2. In an automatic release handle, a curved bar hinged at one end, and a catch for detachably holding the free end of the bar, said bar being curved uniformly throughout its entire length.

3. In an automatic release handle, a bar hinged at one end, and a catch for detachably holding the free end of the bar, said bar being curved in the arc of a circle and the curvature extending entirely to the free end of the handle.

4. In an automatic release handle, a bar hinged at one end, and a catch for detachably holding the free end of the bar, the entire bar being in the form of an arc of a circle.

5. In an automatic release handle, a bar hinged at one end, and a catch for detachably holding the free end of the bar, the entire bar being in the form of an arc of a circle approximately the size of a circle drawn about an equilateral triangle whose sides are equal in length to a straight line connecting the hinge with the free end of the bar.

In testimony whereof, I sign this specification in the presence of two witnesses.

JAMES H. DONALDSON.

Witnesses:
Wm. F. Freudenreich,
Ruth E. Zettervall.

---

Copies of this patent may be obtained for five cents each, by addressing the "Commissioner of Patents, Washington, D. C."